2,758,989
Patented Aug. 14, 1956

United States Patent Office

2,758,989
POLYMERIZATION OF CYCLOOCTATETRAENE

Marilyn J. Maue, East Orange, N. J., assignor to The M. W. Kellogg Company, Jersey City, N. J., a corporation of Delaware No Drawing. Application April 10, 1953,
Serial No. 348,125

6 Claims. (Cl. 260—93.1)

This invention relates to new polymeric materials and the method for their preparation. More specifically, it relates to new and useful polymeric materials and their production from cyclo-octatetraene. This application is a continuation-in-part of application Serial No. 301,978, filed July 31, 1952, now abandoned.

It is an object of the present invention to provide novel polymeric materials derived from cyclo-octatetraene.

Another object of the present invention is to provide a new and useful moldable resin of good thermal stability and chemical inertness.

Another object of the present invention is to provide a new and useful protective coating material.

Another object of the present invention is to provide a new and useful self-supporting polymeric film.

Another object of the present invention is to provide a process for the preparation of polymeric materials derived from cyclo-octatetraene.

Still another object of this invention is to provide a new and useful method for applying a protective coating to a surface susceptible to corrosion.

Other objects and advantages of the present invention will be apparent to those skilled in the art from the following description.

In accordance with the present invention a novel polymeric material is prepared by the method comprising subjecting cyclo-octatetraene to an activation which will render the material susceptible to polymerization and then allowing it to polymerize under suitable conditions, namely, by a "wall reaction."

The starting material, cyclo-octatetraene, utilized in this invention, is an available material readily prepared by a known method comprising polymerizing compressed acetylene in the presence of a solvent, preferably tetrahydrofuran, and a catalyst consisting of certain nickel compounds. Nickel compounds, which are able to catalyze the polymerization, are those in which the nickel is bound loosely to the anion as in such compounds as $NiCNS$ and $Ni(CN)_2$. Nickle halides in the presence of ethylene oxide may be used as catalysts by the formation of alcoholate bonds. Tetrahydrofuran, the preferred solvent, reacts in much the same manner as ethylene oxide. It has been postulated that the actual catalysts are the unstable acetylene-nickel compounds which are formed by the action of acetylene under pressure upon the nickel compound.

Cyclo-octatetraene is a yellow colored liquid which boils at about 142° C.–143° C. at atmospheric pressure. It contains a cyclic structure with four alternate double bonds. While it is symmetrical and contains conjugated bonds, it has been shown to be non-planar and not substantially stabilized by resonance. Owing to the olefinic character of cyclo-octatetraene, it is easily subjected to oxidation, halogenation and catalytic hydrogenation. It has also been shown to aromatize in the presence of various oxidizing agents.

The activation of cyclo-octatetraene to form activated molecules susceptible to polymerization is generally accomplished at temperatures between about 350° C. and about 1000° C. and pressures between about 0.1 mm. and 1 atmosphere, and takes place in the vapor phase. Activated molecules are often called "hot radicals" due to the fact that they possess energy in excess of the amount found normally associated with their most stable state.

Activated molecules are also different in structure from the normal stable molecules and when polymerized directly from the activated state, produce polymers different from those produced by polymerization from the stable state.

Thermal activation of cyclo-octatetraene molecules preferably takes place at temperatures above about 350° C. and as high as about 1000° C., the more preferred temperature range of operation being between about 500° C. and about 900° C. The time required for thermal activation may range from about 0.01 second to about 1 minute and preferably from about 0.1 second to 10 seconds. Exposure of cyclo-octatetraene to elevated temperatures for longer periods may result in cracking and undesirable side reactions. The starting material may be subjected to heat by any suitable means, such as by an electric furnace arranged in a single pass or recycle system. It is also possible to recycle through the heat system unactivated cyclo-octatetraene obtained from the product recovery system.

The activated cyclo-octatetraene molecules should be polymerized while they are still in activated state. Activated molecules of cyclo-octatetraene maintained for lengthy periods at elevated temperatures below the activation temperatures are converted to stable molecules and polymerize as such. The activated molecules, however, have some stability and may be maintained for periods up to an hour or more without either polymerizing or converting to stable molecules. In general, however, it is preferable to cool the activated molecules to condensation conditions directly from the conditions of activation.

The polymerization of the activated cyclo-octatetraene molecules or "hot radicals" is brought about by removing the excess energy which was imparted to them through activation and then allowing them to undergo a free radical reaction to form long polymeric molecules. This is usually accomplished by providing another body, termed a "cold wall" for the purposes of this invention, to which the activated molecules may impart their energy of activation. The activated molecules collide with the wall, lose their energy of activation, and are thus polymerized. This is termed the "wall reaction." The time for the polymeric material to form is dependent upon the temperature of the cold wall, the temperature and rarity of the vapor stream, and the rate of feed. In order to obtain the polymer of this invention, the vapors should be quenched rapidly, generally within a period of from 0.01 second to 1 minute, and preferably within a period of from 0.1 to 10 seconds. Although the activated molecules can yield their excess energy to any object containing molecules with less energy, the cold wall in this invention is generally maintained at a temperature between about room temperature, such as 25° C., and —80° C. At higher temperatures and/or slower quenching times, inferior polymers of much lower molecular weight are produced. Within the ranges which produce the polymer of this invention, lower temperatures and faster quenching times are preferred since slower polymerization is conducive to orientation of the polymer molecules with a detrimental effect on the physical characteristics of the polymer.

It is also preferable to carry out the polymerization at low partial pressures, as, for example, not higher than 100 mm. of mercury to minimize cracking in the vapor state and other undesirable reactions and to facilitate the collision of the individual molecules with the cold wall. Although low overall pressures may be used, it is generally preferable to achieve the low partial pressures, at least in part, by dilution of the cyclo-octatetraene feed with an inert diluent, such as steam, nitrogen, carbon dioxide or methane.

The cyclo-octatetraene may also be diluted with other active vapor constituents which are capable of polymerization under similar pyrolysis and quenching conditions. For example, it may be diluted with paraxylene or with any paramethyl-substituted aromatic compound and thereby produce corresponding copolymers.

Upon quenching, the polymer forms as a film on the cold surface, while unreacted cyclo-octatetraene, diluents, and by-product materials are in liquid or vapor phase except at extremely low quenching temperatures, and in that case are easily liquefiable. If desired, the unreacted cyclo-octatetraene and diluents may be separated, as by distillation, from the by-product materials and recycled to the pyrolysis step.

Substantially improved yields are obtained by employing the well known non-acid aromatization catalysts. Aromatization catalysts are those which are commonly used for preparing aromatic hydrocarbons from acyclic and alicyclic hydrocarbons of comparable molecular weight. A listing of aromatization catalysts may be found, for example, in the textbook "Catalysis" by Berkman, Morrell and Egloff (Reinhold Publishing Corporation, 1945), pages 997–1000. Any of the non-acid materials in this listing may be used. The catalysts include various classes, such as, for example, activated carbon, elemental selenium and the oxides and non-acid salts of metals from periodic groups IVA, VB, VIB and VIII. Specific examples of metallic compound catalysts are tungsten sulfide, tungsten oxide, chromia, silica, molybdenum oxide, vanadium pentoxide, platinum sulfate, palladium sulfate, nickel sulfate, nickel oxide, etc., with or without catalyst supports, e. g., alumina gel, titania gel, magnesia gel, etc. For this reaction the particularly desirable catalysts are selenium, vanadium pentoxide and chromium trioxide. Usually the activation in vapor phase of cyclo-octatetraene is carried out at partial pressures between 0.1 mm. and about 1 atmosphere. To reduce the thermal cracking effects, it is preferred to use partial pressures within the range of about 0.1 mm. to about 100 mm., particularly when temperatures above 500° C. are used.

A preferred procedure for preparing the polymer of the present invention comprises heating the cyclo-octatetraene to a temperature between about 500° C. and about 900° C. under pressure, preferably between about 0.1 mm. and about 100 mm. for a period of time ranging from one-tenth of a second to ten seconds. The vapor stream is then cooled in a zone maintained at −80° C. to form a polymeric material.

The polymer produced in accordance with this invention is a white or transparent solid film which does not soften when heated up to 250° C. It is resistant to solution and to swelling when exposed to common solvents including low-boiling aliphatic and aromatic hydrocarbons, oxygenated hydrocarbons and halogenated hydrocarbons. It is also resistant to attack by strong alkali and by concentrated sulfuric acid. The film may be deposited as either an adherent or a non-adherent film, depending on the nature of the surface upon which it is deposited. Adherent films are particularly useful as coatings. For this purpose the surface to be protected may be arranged to form all or a portion of the "cold wall" required.

If desired, the polymer may be deposited on a polished surface and then peeled off as a self-supporting film. The self-supporting film is useful as such, or it may be converted to a polymer powder for molding or other uses. The film may be converted to powder either by mechanical comminution or by solution and precipitation of the film. While, as stated above, the polymer is insoluble in most solvents, it has some solubility at elevated temperatures in polycyclic aromatic compounds such as naphthalene and anthracene.

To facilitate a fuller and more complete understanding of the subject matter in this invention, certain specific examples herewith follow, but it is clearly to be understood that these examples are provided by way of illustration and should not be considered as unduly limiting the invention.

*Example I*

Cyclo-octatetraene vapor at a partial pressure of 8 to 10 mm. of mercury is passed through a tube heated to 750° C. at such a rate that the vapor is subjected to this temperature for from 0.3 to 0.4 second. The vapors leaving the tube are passed into a trap in which they are cooled at 0° C. in contact with a cold surface on which the polymerized product is deposited in the form of a white, occasionally transparent film.

*Example II*

Cyclo-octatetraene vapor at a partial pressure of 150 mm. of mercury is passed through a tube heated at 750° C. and containing vanadium oxide at such a rate that the vapor is subjected to this temperature for about 0.2 second. The vapors leaving the tube are cooled to 0° C. for several hours and the polymerized product is deposited.

*Example III*

Cyclo-octatetraene vapors at a partial pressure of one atmosphere are passed through a tube heated at 500° C. at such a rate that the vapor is subjected to this temperature for about 0.2 second. The vapors leaving the tube are passed over steel wool as they are cooled in a trap maintained at −80° C. to deposit the solid polymer.

*Example IV*

Cyclo-octatetraene vapors at a partial pressure of 5 atmospheres are passed through a tube heated to 500° C. and containing chromium trioxide at such a rate that the vapor is subjected to this temperature for about 30 seconds. The vapors leaving the tube are passed over steel wool as they are cooling in a trap maintained at a temperature of 0° C. and are then further cooled in a trap maintained at −80° C. until a solid polymeric film is formed.

Having thus provided a description of my invention, by furnishing specific examples thereof, it should be understood that no undue limitations or restrictions are to be imposed by reason thereof, but that the scope of the invention is defined by the appended claims.

I claim:

1. A process which comprises subjecting cyclo-octatetraene to an elevated temperature between about 350° C. and about 1000° C. sufficient to activate the material, and then rapidly quenching the material thus produced to form a polymeric material.

2. A process which comprises subjecting cyclo-octatetraene to a temperature between about 350° C. and about 1000° C., under a pressure between about 0.1 mm. of mercury and 1 atmosphere, and then rapidly quenching the material thus produced to a temperature between about room temperature and about −80° C. to form a polymeric product.

3. A process comprising subjecting cyclo-octatetraene to a temperature between about 500° C. and about 900° C., at a partial pressure of about 100 mm. of mercury to about 1 atmosphere, and then rapidly quenching the material thus produced to a temperature between about 0° C. and about −80° C. to form a polymeric product.

4. A process which comprises subjecting cyclo-octatetraene to a temperature between about 350° C. and about 1000° C., under a pressure between about 0.1 mm.

of mercury and 1 atmosphere for a period of time between about 0.01 second and about 1 minute, and then rapidly quenching the material thus produced within a period of from about 0.01 second to about 1 minute to a temperature between about room temperature and about —80° C. to form a polymeric product.

5. A process comprising subjecting cyclo-octatetraene to a temperature between about 500° C. and about 900° C., at a partial pressure between about 0.1 mm. and about 100 mm. of mercury for a period of time between about 0.1 second and 10 seconds, and then rapidly quenching the material thus produced within a period of from about 0.1 second to about 10 seconds to a temperature between about 0° C. and about —80° C. to form a polymeric product.

6. A process which comprises subjecting cyclo-octatetraene to a temperature between about 350° C. and about 1000° C., under a pressure between about 0.1 mm. of mercury and 1 atmosphere in the presence of an aromatization catalyst, and then rapidly quenching the material thus produced to a temperature of about room temperature to about —80° C. to form a polymeric product.

References Cited in the file of this patent

FOREIGN PATENTS 673,651    Great Britain  _____ June 11, 1952

OTHER REFERENCES

Cope et al.: J. Am. Chem. Soc., 72, 1128, 1129, March, 1950.

Scott et al.: J. Am. Chem. Soc., 71, 1634–1636, May, 1949.